(12) United States Patent
Jing et al.

(10) Patent No.: US 9,823,802 B2
(45) Date of Patent: Nov. 21, 2017

(54) ARRAY PRESSURE-SENSING IMAGING DEVICE

(71) Applicants: BOE Technology Group Co., Ltd., Beijing (CN); HEFEI BOE Optoelectronics Technology Co., Ltd., Hefei (CN)

(72) Inventors: Yangkun Jing, Beijing (CN); Xing Wu, Beijing (CN)

(73) Assignees: BOE Technology Group Co., Ltd., Beijing (CN); Hefei BOE Optoelectronics Technology Co., Ltd., Hefei (CN)

( * ) Notice: Subject to any disclaimer, the term of this patent is extended or adjusted under 35 U.S.C. 154(b) by 170 days.

(21) Appl. No.: 14/804,951

(22) Filed: Jul. 21, 2015

(65) Prior Publication Data

US 2016/0162079 A1   Jun. 9, 2016

(30) Foreign Application Priority Data

Dec. 3, 2014   (CN) .......................... 2014 1 0728255

(51) Int. Cl.
*G06F 3/045*   (2006.01)
*G06F 1/16*    (2006.01)
*G06F 3/041*   (2006.01)

(52) U.S. Cl.
CPC ............... *G06F 3/045* (2013.01); *G06F 1/16* (2013.01); *G06F 3/0414* (2013.01); *G06F 2203/04102* (2013.01); *G06F 2203/04105* (2013.01); *G06F 2203/04106* (2013.01)

(58) Field of Classification Search
None
See application file for complete search history.

(56) References Cited

U.S. PATENT DOCUMENTS

| | | | |
|---|---|---|---|
| 4,634,917 A | 1/1987 | Dvorsky et al. | |
| 2011/0043491 A1* | 2/2011 | Oh | G06F 3/0234 345/177 |
| 2011/0308942 A1 | 12/2011 | Liu et al. | |
| 2016/0246081 A1* | 8/2016 | Jing | H01L 21/6838 |

FOREIGN PATENT DOCUMENTS

| | | |
|---|---|---|
| CN | 101201278 A | 6/2008 |
| CN | 101211190 A | 7/2008 |
| CN | 101260237 A | 9/2008 |
| CN | 202057930 U | 11/2011 |
| CN | 102539035 A | 7/2012 |
| CN | 103335754 A | 10/2013 |
| CN | 203672526 U | 6/2014 |
| CN | 203824682 U | 9/2014 |

OTHER PUBLICATIONS

Feb. 26, 2016—(CN)—First Office Action Appn 201410728255.X with English Tran.
Oct. 9, 2016—(CN) Second Office Action Appn 201410728255.X with English Tran.

* cited by examiner

*Primary Examiner* — Ifedayo Iluyomade
(74) *Attorney, Agent, or Firm* — Banner & Witcoff, Ltd.

(57) ABSTRACT

An array pressure sensing imaging device is provided. The array pressure-sensing imaging device includes a flexible surface sensing layer, a pressure sensing layer, a three-dimensional pressure sensing layer, a pressure adjustment layer laminated in a sequence and communicatively connected to a control unit.

19 Claims, 4 Drawing Sheets

ARRAY PRESSURE-SENSING IMAGING DEVICE

This application claims priority to Chinese Patent Application No. 201410728255.X filed on Dec. 3, 2014. The present application claims priority to and the benefit of the above-identified application and is incorporated herein in its entirety.

TECHNICAL FIELD

Embodiments of the present disclosure relate to an array pressure sensing imaging device.

BACKGROUND

In the procedure of exactly reproducing AMOLED, it requires to detect a surface height difference and an internal deformation resistant capability of a substrate being deposited with an organic film, so that packaging pressures are set at different positions according to detected results in the packaging procedure, which effectively improves packaging efficiency and packaging quality, and it has a great help to improve display effect.

SUMMARY

Embodiments of the present disclosure provide an array pressure sensing imaging device. The array pressure-sensing imaging device includes a flexible surface sensing layer, a pressure sensing layer, a three-dimensional pressure sensing layer, a pressure adjustment layer and a control unit.

The flexible surface sensing layer senses flatness information of a surface of a pressed object and transmits it to the control unit. The pressure sensing layer senses information of a force in the vertical direction between the pressed object and the array pressure-sensing imaging device and transmits it to the control unit. The three-dimensional pressure sensing layer senses information of a force in the horizontal direction between the pressed object and the array pressure-sensing imaging device and transmits it to the control unit. The control unit sends a control command to the pressure adjustment layer to adjust the force applied on the pressed object by the array pressure-sensing imaging device based on the received flatness information of the surface of the pressed object and the information of the force in the vertical and/or horizontal direction between the pressed object and the array pressure-sensing imaging device.

DETAILED DESCRIPTION

Technical solutions according to the embodiments of the present disclosure will be described clearly and completely as below in conjunction with the accompanying drawings of embodiments of the present disclosure. It is apparent that the described embodiments are only a part of but not all of exemplary embodiments of the present disclosure. Based on the described embodiments of the present disclosure, various other embodiments and variants can be obtained by those of ordinary skill in the art without creative labor and those embodiments and variants shall fall into the protection scope of the present disclosure.

Unless otherwise defined, all the technical and scientific terms used herein have the same meanings as commonly understood by one of ordinary skill in the art to which the present disclosure belongs. The terms, such as "first," "second," or the like, which are used in the description and the claims of the present application, are not intended to indicate any sequence, amount or importance, but for distinguishing various components. Also, the terms, such as "a/an," "one," or the like, are not intended to limit the amount, but for indicating the existence of at lease one. The terms, such as "comprise/comprising," "include/including," or the like are intended to specify that the elements or the objects stated before these terms encompass the elements or the objects and equivalents thereof listed after these terms, but not preclude other elements or objects. The terms, "on," "under," or the like are only used to indicate relative position relationship, and when the position of the object which is described is changed, the relative position relationship may be changed accordingly.

The inventors notice that the early pressure-sensitive surface detection device mainly includes mechanical pressure-sensitive surface detection device and flexible touch sensor, they have larger volume and lower spatial resolution, and their pressure-sensitive surfaces are "rigid", i.e. the pressure-sensitive surface cannot be bended so as to be mounted at a surface required to be detected (an alignment surface, an AMOLED coated surface, or the like), so they are difficult to be widely used in a field of surface detection technology. With the development of pressure-sensitive surface technology, a capacitive pressure-sensitive surface detection device and an optical pressure-sensitive surface detection device are developed. When a capacitive pressure-sensitive surface was subjected to force, one of the electrodes would occur slight movement, so as to cause a change in capacitance. Since the capacitive pressure-sensitive surface detection device has movable electrodes, its life is affected, and its reliability is not high, and it is hard to obtain tangential force information, that is, it cannot detect three-dimensional force information. The optical pressure-sensitive surface detection device is mainly an optical fiber pressure-sensitive surface detection device, the optical pressure-sensitive surface detection device has a complicated detection system, which further needs to externally connect a lighting optic fiber micro CCD and a high speed computer for image processing in addition to pressure-sensitive surface itself. Therefore, it is difficult to achieve miniaturization. All of the above pressure-sensitive surfaces are difficult to meet the requirements of integration, miniaturization and intelligence.

Furthermore, with the development of nanometer film touch technology, touch sensing is the basis of realizing intelligent control. The nanometer film material identifies a variety of physical information of the target or object by using a touch sensitive member, such as contact force, flexibility, hardness, elasticity, roughness, and material quality. The functionality touch-sensitive nanometer film can enhance its capability of completing a fine and complicated work in various environments, which have a great effect on improving the detection accuracy, failure rate of the vacuum assembling system, and precision operation micro-drive feedback.

For a pressure-sensitive plane cannot sense a state of a substrate, which disables the pressure-sensitive detection procedure of the substrate to be well controlled, therefore, a micro-tensioning system of the pressure-sensitive plane becomes very important. The pressure-sensitive surface detection device is an indispensable means for surface detection to obtain tactile information. Based on the information provided by the pressure-sensitive detection device, the surface detection can reliably capture a target object and further sense the physical characteristics, such as size, shape, weight, soft and hard. The development trend of the pressure-sensitive surface detection device is integration, miniaturization and intelligence. An integrated pressure-sensitive surface array includes a plurality of sensing units, each sensing unit can independently obtains outside information, and an organic combination or integration of a plurality of sensing units can achieve functions that cannot be achieved by a single sensing unit. To accurately obtain tactile information and be suitable for a surface having any shape, the pressure-sensitive surface detection device needs to have a certain flexibility, thereby it can be mounted on a surface having any shape to adapt to different surface detection applications, and can accurately obtain the three-dimensional contact force information.

The implementations or embodiments of the present disclosure will be described in detail in conjunction with the accompany drawings.

Figure 1:
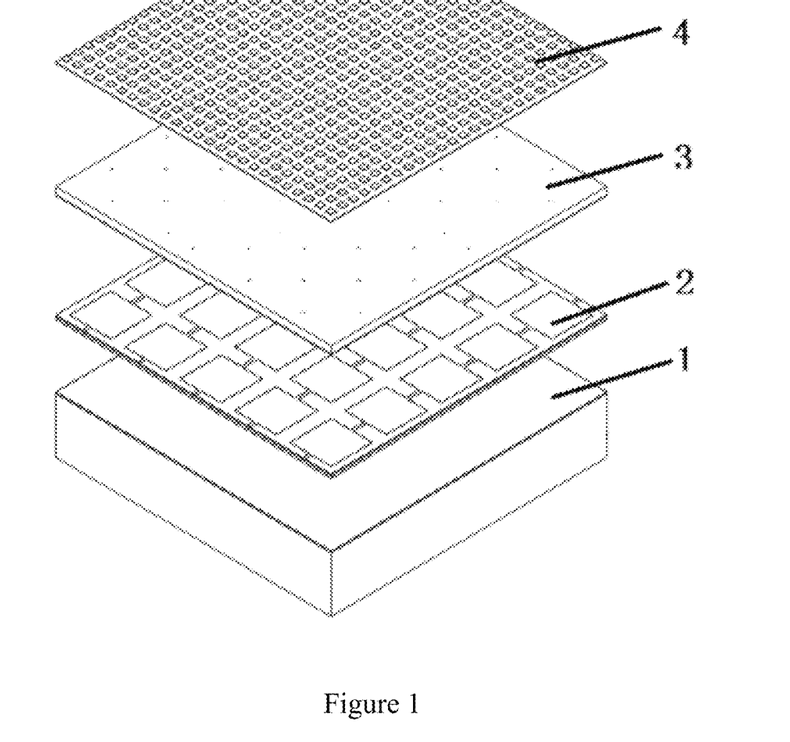
FIG. 1 is a schematic structural view of the array pressure-sensing imaging device according to an embodiment of the present disclosure.

As shown in FIG. 1, an embodiment of the present disclosure provides an array pressure sensing imaging device, which includes a flexible surface sensing layer 4, a pressure sensing layer 3, a three-dimensional pressure sensing layer 2, a pressure adjustment layer 1 and a control unit (not shown in the Figure). The flexible surface sensing layer 4, the pressure sensing layer 3, the three-dimensional pressure sensing layer 2 and the pressure adjustment layer 1 laminates to each other in a sequence. The flexible surface sensing layer 4, the pressure sensing layer 3, the three-dimensional pressure sensing layer 2 and the pressure adjustment layer 1 are communicated with the control unit.

The flexible surface sensing layer 4 senses flatness information of a surface of a pressed object and transmits it to the control unit. The pressure sensing layer 3 senses information of a force in the vertical direction between the pressed object and the array pressure-sensing imaging device and transmits it to the control unit. The three-dimensional pressure sensing layer 2 senses information of a force in the horizontal direction between the pressed object and the array pressure-sensing imaging device and transmits it to the control unit. The control unit sends a control command to the pressure adjustment layer 1 to adjust the force applied on the pressed object by the array pressure-sensing imaging device based on the received flatness information of the surface of the pressed object and the information of the force in the vertical and/or horizontal direction between the pressed object and the array pressure-sensing imaging device. The following will describe the array pressure-sensing imaging device provided by embodiments of the present disclosure in more details.

Figure 5:
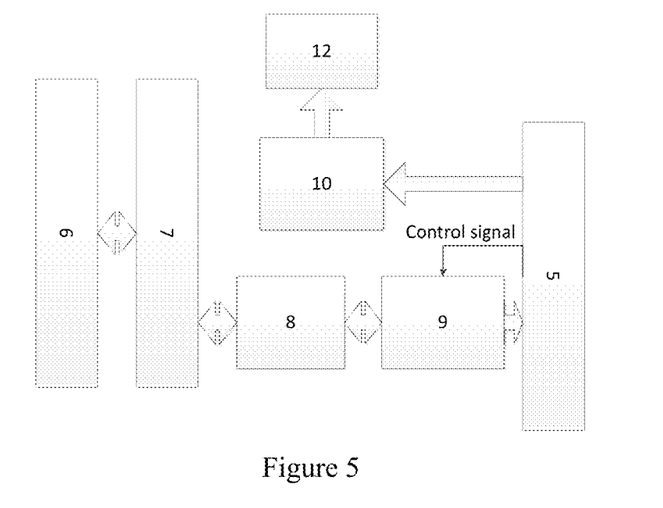
FIG. 5 is a schematic diagram of a control system according to an embodiment of the present disclosure.

In an example, as shown in FIG. 5, the three-dimensional pressure sensing layer 2 senses information of a force between the pressed object and the array pressure-sensing imaging device and transmits it to a multi-layer pressure data comparing unit 6. The multi-layer pressure data comparing unit 6 compares the received force data with a pre-stored standard data, and interchanges the compared result with the multi-layer pressure data integration unit 7, and sends the integrated data to the signal shaping circuit 8. The shaped signal is sent to the A/D converting module 9 and converted to a digital signal and then is sent to a control unit 5 (e.g., PLC control unit). The control unit 5 sends a control command to the pressure adjustment layer 1 to adjust the force applied on the pressed object by the array pressure-sensing imaging device based on the converted data information signal of the surface of the pressed object and the information of the force in the vertical and/or horizontal direction between the pressed object and the array pressure-sensing imaging device. In addition, the control unit 5 may send a command to a PC data processing center 10, and the PC processing center 10 sends the converted data signal to a display. Alternately, the control unit 5 may send a command directly to the multi-layer pressure data integration unit 7 (not shown).

In an example of an embodiment of the present disclosure, the flexible surface sensing layer is made of flexible conductive composite material. For example, the flexible surface sensing layer is made of a polymer matrix material filled with carbon series conductive material. The carbon series conductive material includes carbon black-silicone rubber and carbon fiber-polydimethylsiloxane. In the carbon black-silicone rubber, the carbon black is about 2 wt. % to 15 wt. % of the total carbon black-silicone rubber, for example, 8 wt. %. The carbon fiber in the carbon fiber-polydimethylsiloxane is about 8 wt. %-17 wt. %, for example, 12 wt. %.

The flexible surface sensing layer 4 uses a flexible conductive composite material as static concave and convex plane pressure-sensitive bonding material. This flexible surface sensing layer 4 has a good surface flexibility, and it can be pressed into the detected substrate or the concave and convex portions of a detected object. It can effectively collect surface data of the detected substrate, and it has a function of protecting the detected substrate in the dynamic detection. For example, a polymer matrix material is filled with different carbon series conductive material (such as carbon black, graphite, carbon fiber), and it can be prepared as a conductive friction material having a mechanical or temperature sensitivity. This design uses carbon black-silicone rubber as a force-sensitive conductive rubber. The force sensitive conductive rubber functions in a manner of the body piezoresistive effect combining with the surface piezoresistive effect. The bonding layer is made of force-sensitive conductive rubber material. The present embodiment uses carbon black-silicone rubber as a force sensitive conductive material, and the carbon black-silicone rubber is a force-sensitive conductive rubber filled with carbon black. The carbon black is about 8 wt. % of the total conductive material, for example.

The force sensitive conductive rubber material has scalability, as the pressure is increased, the volume percentage of the force sensitive conductive rubber is reduced, and the volume percentage of conductive particles is increased, and its electrical resistivity will be reduced as the subjected pressure is increased.

The force sensitive conductive rubber has a rough surface, the electrode material is not completely in contact with the force sensitive conductive rubber surface, and there is a surface contact resistance between them, and the contact resistance is affected by the contacting area between the force sensitive conductive rubber and the electrode.

Figure 2:
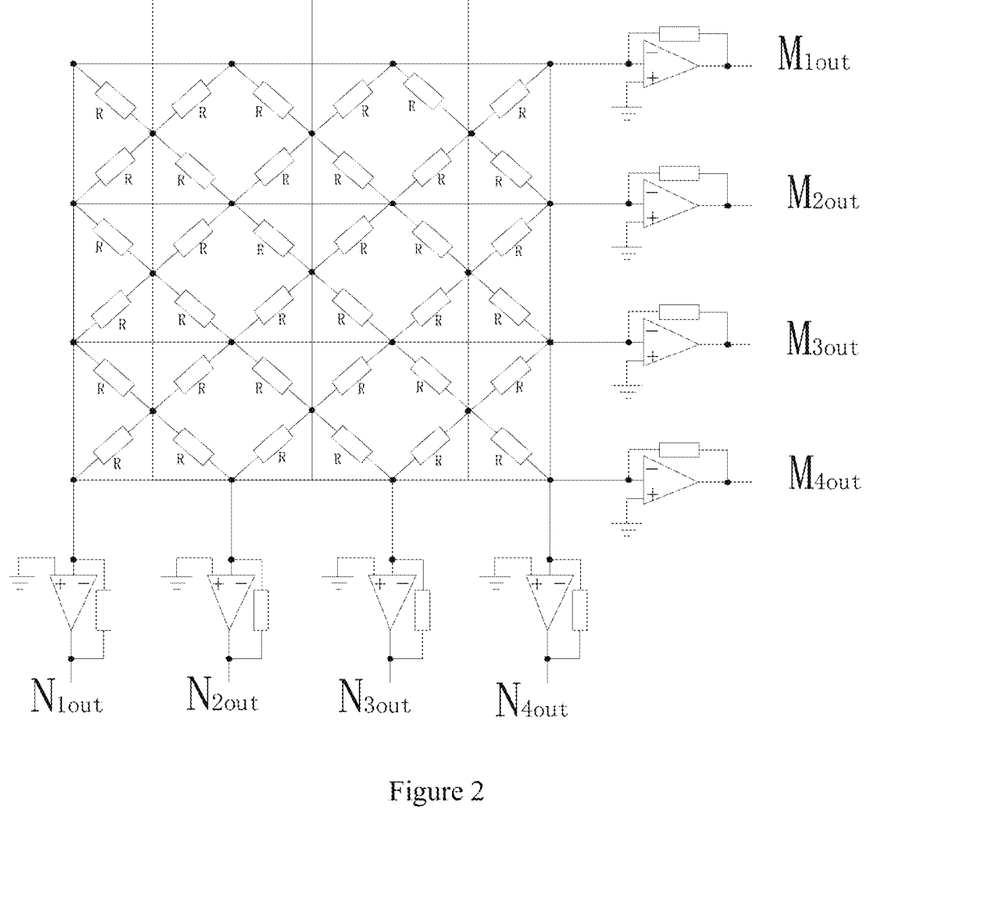
FIG. 2 is an equivalent circuit diagram of the flexible surface sensing layer according to an embodiment of the present disclosure.

FIG. 2 an equivalent circuit diagram of the flexible surface sensing layer. The flexible surface sensing layer 4 has a plurality of sensing points, and the electrode material and the force sensitive conductive rubber form a sensing unit at each sensing point. The surface resistance of the electrode and the force sensitive conductive rubber in each sensing unit corresponds to the resistor R in FIG. 2. When the force sensitive conductive rubber is compressed due to being subjected to surface friction, it allows the force sensitive conductive rubber surface to further contact with the resistor in the micron scale, and the contact area between them is increased, so that the surface resistance is reduced. When the force sensitive conductive rubber is stretched due to being subjected to a force, it allows the force sensitive conductive rubber surface to be separated from the electrode, and the contact area is reduced, so that the resistance is increased.

In the embodiment, in the procedure of the flexible surface sensing layer 4 being made pressure-sensitive detection, the force sensitive conductive rubber is subjected to a pressure, and the volume of the conductive particles is not affected by the pressure, and the force sensitive conductive rubber has a compressibility. Therefore, as the pressure is increased, the volume percentage of the force sensitive conductive rubber is reduced, so that the volume percentage of the conductive particles is increased, and the resistivity of the force sensitive conductive rubber will be reduced as the pressure is increased. As the force sensed by the sensing unit is changed, the resistance generated by each equivalent resistor is changed, and the information of the resistance changing is transmitted out via transmission lines in different directions.

As shown in FIG. 2, the transmission lines in different directions includes the resistance value output line $M_{1out}$, $M_{2out}$, $M_{3out}$ ... $M_{nout}$ in the horizontal direction and the resistance value output line $N_{1out}$, $N_{2out}$, $N_{3out}$ ... $N_{mout}$ in the vertical direction, where M, and N correspond to row number and column number of the sensing unit of the flexible surface sensing layer 4, respectively. For example, each of the transmission lines perceived in different directions of the flexible surface sensing layer 4 is provided with a signal amplification circuit for amplifying a signal. An inverting input of the signal amplification circuit is connected to the output end of the transmission line, and another input of the same end of the signal amplification circuit is connected to the ground. The inverting input and the output are further connected to a resistor. The output outputs the amplified signal.

In FIG. 2, the information of the resistance changing transmitted from the transmission line in the same direction represents the flatness information of the pressed object sensed by the flexible surface sensing layer, and the flatness information of the pressed object sensed by the flexible surface sensing layer is transmitted to the control unit so as to dynamically determine the change of the pressure in the pressure-sensitive detection.

Figure 3:
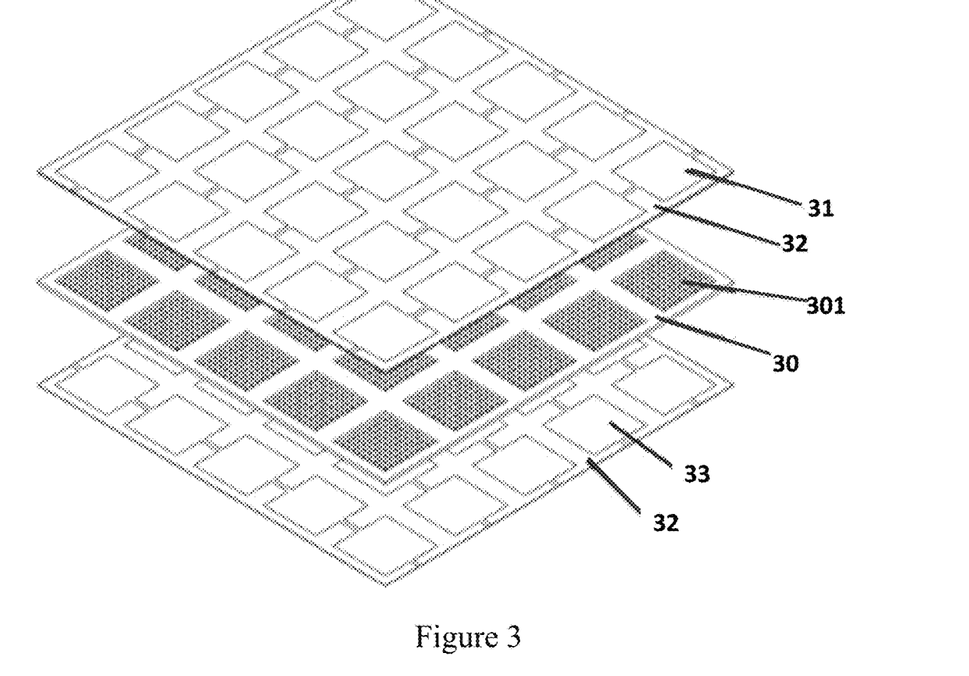
FIG. 3 is a schematic structural view of the pressure sensing layer according to an embodiment of the present disclosure.

In an embodiment of the present disclosure, as shown in FIG. 3, the pressure sensing layer 3 includes a first electrode plate 31 and a second electrode plate 33 forming a capacitor, and a dielectric layer 30 is disposed between the first electrode plate and the second electrode plate. Each of the first electrode plate 31 and the second electrode plate 33 is provided with a flexible electrode substrate 32, and an electrode plate is attached to the flexible electrode substrate 32. The electrode plates 31, 33 are made of Ti or Au. The surface of the dielectric layer is patterned into a plurality of small rectangular pyramid areas 301.

For example, as shown in FIG. 3, the pressure sensing layer 3 includes a first flexible electrode substrate 32 with a capacitive Ti or Au lower electrode plate attached to its upper surface, a rectangular pyramid dielectric layer 30 with its upper surface patterned into small rectangular pyramid areas, and a second flexible electrode substrate 32 with a capacitive Ti or Au upper electrode plate attached to its upper surface, overlapped from each other. The capacitive Ti or Au upper electrode plate and the capacitive Ti or Au lower electrode plate are arranged in an orthogonal direction, each pair of opposed capacitive Ti or Au upper electrode plate and lower electrode plate forms a capacitor, and each capacitor has small rectangular pyramid areas acting as the capacitive dielectric layer. Each capacitor acts as a sensing unit, all of the sensing units form a capacitor array, and the sensing array has a good static and dynamic performance. The sensing array can work whether it is instant touch or it is continuously compressed by a force.

In the embodiment of the present disclosure, the pressure sensing layer 3 includes a plurality of piezoelectric sub-structures made of piezoelectric material and the corresponding processing circuit, and each piezoelectric sub-structure corresponds to a sub-area location of the pressed object. The piezoelectric sub-structure senses the pressure information received by the pressed object and transmits it to a processing circuit for making processing, and the processing circuit transmits the processed pressure information between the pressed object and the array pressure-sensing imaging device to a control unit. Each piezoelectric sub-structure includes a dynamic pressure surface, a piezoelectric sensing layer and a bonding layer from top to bottom.

When the array pressure-sensitive surface imaging detection is performed on the substrate of a display panel and the pressed object, the piezoelectric sensing layer of each piezoelectric sub-structure generates a pressure induced current corresponding to the pressure according to the pressure applied by the sub-region of the pressed object corresponding to the piezoelectric sub-structure (a force in the vertical direction between the pressed object and the array pressure-sensing imaging device), and transmits it to the processing circuit; and the processing circuit transmits the processed pressure information between the pressed object and the array pressure-sensing imaging device to the control unit.

The pressure sensing layer 3 may also use a piezoelectric ceramic material. The piezoelectric ceramic material refers to a polycrystal formed with arbitrary fine grains, which is fabricated by mixing the necessary raw material and then performing granulation, molding, high temperature sintering process, such as barium titanate series, lead zirconate titanate binary series and the like. Deformation would occur to the piezoelectric ceramic material under an external force or electric field, and produce electrical opposite charges on the two side surfaces corresponding to the deformation. Therefore, in the pressure-sensitive detection process of detecting the pressed object, the pressed object applies a pressure on the array surface pressure-sensitive imaging device, the pressure-sensitive imaging device formed with the piezoelectric ceramic material in each piezoelectric sub-structure detects the deformation generated by a dynamic pressure surface under the pressure, so that the bonding of the pressed object and the array pressure-sensing imaging device is increased, and respectively generates positive charges and negative charges on the two sides of the deformed location, wherein the positive charges and negative charges have same electric quantity, and the electric quantity is associated with the deformation degree.

Figure 4:
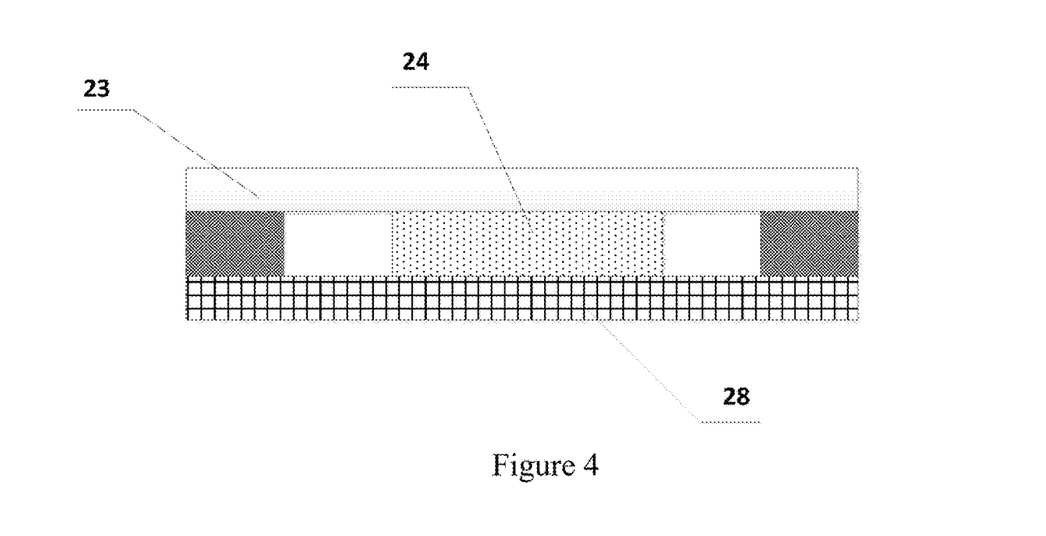
FIG. 4 is a schematic structural view of the three-dimensional pressure sensing layer according to an embodiment of the present disclosure.

In an embodiment of the present disclosure, as shown in FIG. 4, the three-dimensional pressure sensing layer 2 includes a three-dimensional pressure-sensitive unit on the pressure-sensitive surface and a signal processing circuit 28 to which it is connected. The three-dimensional pressure sensing layer 2 senses information of a force in the horizontal direction between the pressed object and the array pressure-sensing imaging device and transmits it to a control unit. The three-dimensional pressure sensing layer 2 further includes an elastic protective layer 23, the elastic protective layer 23 is located at the outermost layer of the three-dimensional pressure sensing layer 2. The three-dimensional pressure sensing layer 2 includes an elastic protective layer 23, a three-dimensional piezoresistor 24, a signal processing circuit 28 from outside to inside. The three-dimensional pressure-sensitive unit is a three-dimensional force sensitive array includes a plurality of three-dimensional piezoresistors 24, spaces among the plurality of three-dimensional piezoresistors 24 of the three-dimensional force sensitive array are filled with flexible filling material.

Figure 6:
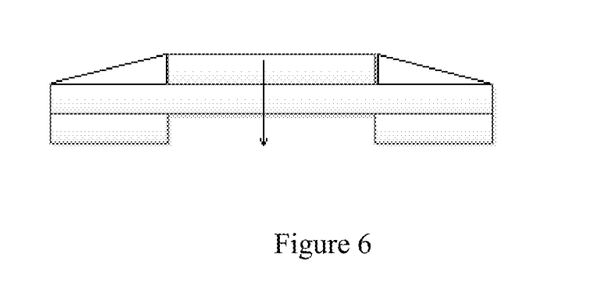
FIG. 6 is a schematic structural view of a three-dimensional piezoresistor according to an embodiment of the present disclosure.

The three-dimensional pressure sensing layer 2 is mainly used to collect lateral force in the horizontal direction, and detect horizontal deformation characteristics of the substrate. A plurality of three-dimensional piezoresistors 24 form the three-dimensional force sensitive array. Three or more three-dimensional piezoresistors 24 are arranged in a rectangular manner to form the three-dimensional force sensitive array. The three-dimensional force sensitive surface has three or more rectangular three-dimensional force sensitive array. The three-dimensional force sensitive array is arranged between the elastic substrate and the signal processing circuit 28. For example, there are eight three-dimensional piezoresistors 24 distributed on a three-dimensional pressure-sensitive unit, which are respectively sensitive to the forces Fx, Fy, and Fz in the X, Y, and Z directions respectively. The signal processing circuit 28 amplifies and converts a voltage signal output from the three-dimensional pressure-sensitive unit, and outputs it to the control unit for processing. The three-dimensional pressure-sensitive unit and the signal processing circuit 28 can exchange their positions.

In the embodiments of the present disclosure, the three-dimensional pressure sensing layer 2 can determine the size of the three-dimensional pressure-sensitive unit, the size of the three-dimensional piezoresistors 24 and the gap between them according to the requirements of a particular application, such as the required spatial resolution, the measuring range of three-dimensional force, sensor sensitivity, detection precision, and the required degree of bending deformation and the like. The three-dimensional pressure-sensitive unit can be bent 90 degrees. The spatial resolution of detecting the three-dimensional force can reach up to 5 mm, and the lowest limit of the detected three-dimensional force is 0.1N.

In an embodiment of the present disclosure, the pressure adjustment layer 1 includes a flatness adjusting mechanism and a preset connection control circuit, and the control circuit outputs a control signal to the flatness adjusting mechanism based on a control current output by the control unit to adjust the pressure applied on the pressed object by the array pressure-sensing imaging device. The flatness adjusting mechanism is a step motor disposed in different direction, for example.

For example, after the array pressure-sensing imaging device applies a pressure on the pressed object, the flexible surface sensing layer senses flatness information of the surface of the pressed object and transmits it to a control unit. The pressure sensing layer senses information of a force in the vertical direction between the pressed object and the array pressure-sensing imaging device and transmits it to the control unit. The three-dimensional pressure sensing layer senses information of a force in the horizontal direction between the pressed object and the array pressure-sensing imaging device and transmits it to the control unit. The control unit generates a concave and convex image of the pressed object based on the received flatness information of the pressed object. The control unit generates an image of the force applied on the pressed object based on the received flatness information of the surface of the pressed object and the information of the force in the vertical and/or horizontal direction between the pressed object and the array pressure-sensing imaging device. The control unit sends a control current to the pressure adjustment layer based on the concave and convex image of the pressed object and the image of the force applied on the pressed object. A control circuit of the pressure adjustment layer 1 outputs corresponding control command to a corresponding step motor based on the received control current. With the above-described manner, the surface of the array pressure-sensing imaging device generates deformation matched with a corresponding area of the pressed object, so as to compensate the flatness of the pressed object, so as to eliminate the uneven pressure caused by height difference of the surface of the pressed object.

In the procedure of pressure-sensitive detecting, after each sub-region of the pressed object is subjected to a pressure, the control unit will compare the pressure applied on the pressed object with the preset pressure, if the pressure is larger than or equal to the upper limit of the preset pressure, an alarm device gives an alarm to avoid crushing the pressed object (for example, if the precision is 0.1 pa, then the pressure range is set to 0.1; if the difference image has a data larger than 0.1, it will send an alarm).

In the array pressure-sensing imaging device provided by embodiments of the present disclosure, it dynamically determines change of a pressure in the pressure-sensitive detection, which improves uniformity of a force applied on the pressure-sensitive detection, so that the pressure-sensitive surface detection is more stable.

The described above are only illustrative embodiments and implementations for explaining the present disclosure, and the present disclosure is not intended to limited thereto. For a person of ordinary skill in the art, various modifications and improvements can be made without departing from the spirit and scope of the present disclosure, and all of which should fall within the protection scope of the present invention. The scope protected by the present disclosure is defined by the claims.

The present application claims priority of Chinese patent application No. 201410728255.X filed on Dec. 3, 2014 entitled "Array pressure-sensing imaging device", the entire contents of which are incorporated herein by reference.

What is claimed is:

1. An array pressure-sensing imaging device, comprising a flexible surface sensing layer, a pressure sensing layer, a three-dimensional pressure sensing layer, a pressure adjustment layer and a control unit; wherein the flexible surface sensing layer senses and transmits flatness information of a surface of a pressed object to the control unit; the pressure sensing layer senses and transmits information of a force in a vertical direction between the pressed object and the array pressure-sensing imaging device to the control unit; the three-dimensional pressure sensing layer senses and transmits information of a force in a horizontal direction between the pressed object and the array pressure-sensing imaging device to the control unit; the control unit sends a control command to the pressure adjustment layer to adjust the force applied on the pressed object by the array pressure-sensing imaging device based on received flatness information of the surface of the pressed object and the information of the force in the vertical and/or horizontal direction between the pressed object and the array pressure-sensing imaging device; and wherein the pressure adjustment layer comprises a flatness adjusting mechanism and a preset connection control circuit, the flatness adjusting mechanism comprises a step motor disposed in different directions.

2. The array pressure-sensing imaging device according to claim 1, wherein the flexible surface sensing layer is made of flexible conductive composite material.

3. The array pressure-sensing imaging device according to claim 1, wherein the flexible surface sensing layer is made of a polymer matrix material filled with carbon series conductive material.

4. The array pressure-sensing imaging device according to claim 3, wherein the carbon series conductive material comprises carbon black-silicone rubber and carbon fiber-polydimethyl siloxane.

5. The array pressure-sensing imaging device according to claim 4, wherein carbon black in the carbon black-silicone rubber is 2 wt. % to 15 wt. %.

6. The array pressure-sensing imaging device according to claim 4, wherein carbon fiber in the carbon fiber-polydimethylsiloxane is 8 wt. % to 17 wt. %.

7. The array pressure-sensing imaging device according to claim 1, wherein the pressure sensing layer comprises a first electrode plate and a second electrode plate, and a dielectric layer is disposed between the first electrode plate and the second electrode plate.

8. The array pressure-sensing imaging device according to claim 7, wherein each of the first electrode plate and the second electrode plate is provided with a flexible electrode substrate, and each of the first electrode plate and the second electrode plate is attached to a respective flexible electrode substrate.

9. The array pressure-sensing imaging device according to claim 7, wherein the first electrode plate and the second electrode plate are made of Ti or Au.

10. The array pressure-sensing imaging device according to claim 7, wherein the first electrode plate and the second electrode plate are arranged orthogonally.

11. The array pressure-sensing imaging device according to claim 7, wherein a surface of the dielectric layer is patterned into small rectangular pyramid areas.

12. The array pressure-sensing imaging device according to claim 1, wherein the pressure sensing layer comprises a plurality of piezoelectric sub-structures made of piezoelectric material and a corresponding processing circuit, and each piezoelectric sub-structure corresponds to a sub-area location of the pressed object; and at least one piezoelectric sub-structure of the plurality of piezoelectric sub-structures senses and transmits pressure information received by the pressed object to the processing circuit for processing, the processing circuit transmits processed pressure information between the pressed object and the array pressure-sensing imaging device to the control unit.

13. The array pressure-sensing imaging device according to claim 12, wherein each piezoelectric sub-structure of the plurality of piezoelectric sub-structures comprises a dynamic pressure surface, a piezoelectric sensing layer and a bonding layer.

14. The array pressure-sensing imaging device according to claim 1, wherein the three-dimensional pressure sensing layer comprises a three-dimensional pressure-sensitive unit on a pressure-sensitive surface and a signal processing circuit to which it is connected.

15. An array pressure-sensing imaging device comprising a flexible surface sensing layer, a pressure sensing layer, a three-dimensional pressure sensing layer, a pressure adjustment layer and a control unit; wherein the flexible surface sensing layer senses and transmits flatness information of a surface of a pressed object to the control unit; the pressure sensing layer senses and transmits information of a force in a vertical direction between the pressed object and the array pressure-sensing imaging device to the control unit; the three-dimensional pressure sensing layer senses and transmits information of a force in a horizontal direction between the pressed object and the array pressure-sensing imaging device to the control unit; the control unit sends a control command to the pressure adjustment layer to adjust the force applied on the pressed object by the array pressure-sensing imaging device based on received flatness information of the surface of the pressed object and the information of the force in the vertical and/or horizontal direction between the pressed object and the array pressure-sensing imaging device, wherein the three-dimensional pressure sensing layer comprises an elastic protective layer, the elastic protective layer is located at the outermost layer of the three-dimensional pressure sensing layer, the three-dimensional pressure sensing layer comprises the elastic protective layer, three-dimensional piezoresistors, and a signal processing circuit, from outside to inside in turn; and wherein the pressure adjustment layer comprises a flatness adjusting mechanism and a preset connection control circuit, the flatness adjusting mechanism comprises a step motor disposed in different directions.

16. An array pressure-sensing imaging device comprising a flexible surface sensing layer, a pressure sensing layer, a three-dimensional pressure sensing layer, a pressure adjustment layer and a control unit; wherein the flexible surface sensing layer senses and transmits flatness information of a surface of a pressed object to the control unit; the pressure sensing layer senses and transmits information of a force in a vertical direction between the pressed object and the array pressure-sensing imaging device to the control unit; the three-dimensional pressure sensing layer senses and transmits information of a force in a horizontal direction between the pressed object and the array pressure-sensing imaging device to the control unit; the control unit sends a control command to the pressure adjustment layer to adjust the force applied on the pressed object by the array pressure-sensing imaging device based on received flatness information of the surface of the pressed object and the information of the force in the vertical and/or horizontal direction between the pressed object and the array pressure-sensing imaging device, wherein the three-dimensional pressure sensing layer comprises a three-dimensional pressure-sensitive unit on a pressure-sensitive surface and a signal processing circuit to which it is connected, the three-dimensional pressure-sensitive unit being a three-dimensional force sensitive array including a plurality of three-dimensional piezoresistors, and spaces among the plurality of three-dimensional piezoresistors of the three-dimensional force sensitive array being filled with flexible filling material; and wherein the pressure adjustment layer comprises a flatness adjusting mechanism and a preset connection control circuit, the flatness adjusting mechanism comprises a step motor disposed in different directions.

17. The array pressure-sensing imaging device according to claim 1, wherein the preset connection control circuit outputs a control signal to the flatness adjusting mechanism based on a control current output by the control unit to adjust the force applied on the pressed object by the array pressure-sensing imaging device.

18. The array pressure-sensing imaging device according to claim 8, wherein the first electrode plate and the second electrode plate are made of Ti or Au.

19. The array pressure-sensing imaging device according to claim 8, wherein the first electrode plate and the second electrode plate are arranged orthogonally.

* * * * *